United States Patent [19]

Webb

[11] Patent Number: 5,201,071

[45] Date of Patent: Apr. 6, 1993

[54] METHOD AND APPARATUS FOR REDUCING THE PEAK ENVELOPE VOLTAGE OF AN RF TRANSMITTER WHILE MAINTAINING SIGNAL AVERAGE POWER

[75] Inventor: Kenneth F. Webb, Cedar Rapids, Iowa

[73] Assignee: Rockwell International Corporation, Seal Beach, Calif.

[21] Appl. No.: 589,305

[22] Filed: Sep. 26, 1990

[51] Int. Cl.$^5$ .............................................. H04B 7/06
[52] U.S. Cl. ..................................... 455/101; 455/103; 375/40; 375/60
[58] Field of Search ............... 455/48, 59, 60, 101, 455/103, 104, 105, 109; 375/40, 38, 43, 60, 61

[56] References Cited

U.S. PATENT DOCUMENTS 4,654,608  3/1987  Minarik et al. .................... 375/61

Primary Examiner—Reinhard J. Eisenzopf
Assistant Examiner—Chi H. Pham
Attorney, Agent, or Firm—M. Lee Murrah; V. Lawrence Sewell; H. Fredrick Hamann

[57] ABSTRACT

The average RF power output of an independent sideband diversity radio transmitter, modulated by a multiple tone data signal, is increased while the RF output peak envelope voltage is held constant. For diversity operation the same information, as a combination of the data tones, is applied to both the upper and lower sideband channels of the RF translator. Adding predetermined phase shifts between the upper and lower sideband audio tone pairs results in a reduced peak envelope voltage at the composite RF output. The final RF amplifier gain can then be increased resulting in a higher average RF power output.

5 Claims, 2 Drawing Sheets

METHOD AND APPARATUS FOR REDUCING THE PEAK ENVELOPE VOLTAGE OF AN RF TRANSMITTER WHILE MAINTAINING SIGNAL AVERAGE POWER

BACKGROUND OF THE INVENTION

The invention relates to new and useful improvements in radio frequency signal transmission, and more particularly to improvements is radio frequency diversity transmission, and more particularly to radio frequency signal transmission by any means or mode which symmetrically places a signal and its diversity copy about a common center frequency, and most particularly to such transmission using multiple tones.

Radio transmissions are subject to many vagaries, both natural and man-made, which can prevent completion of a communications circuit. One strategy used to overcome this problem is termed "diversity" communications. A common type of diversity communications is frequency diversity which involves transmitting the same information via multiple frequencies. In this way one of the frequencies may not be subject to atmospheric effects or intentional interference, and the communications circuit can be successfully completed.

One common form of diversity communications involves using the independent (ISB) mode and imposing the same information on both the upper and lower sidebands. Often the information to be transmitted is in digital form and is thus transmitted in the form of multiple discrete tones. Examples of such transmission techniques include Kineplex, frequency division multiplexed frequency-shift-keying (FSK) and phase-shift-keying (PSK). In these methods identical baseband audio is applied to both the upper sideband (USB) and lower sideband (LSB) channels of an HF transmitter to achieve diversity operation.

One of the unfortunate side effects of such ISB techniques is high peak RF voltage relative to the average power. Since HF power amplifiers are peak voltage limited, the transmitter gain must be reduced in order to prevent overdriving which causes distortion and interference.

It is therefore an object of the present invention to provide more reliable diversity transmission of information via radio signals.

It is a further object of the present invention to provide means to permit an increase in the average output power in a multitone diversity radio transmission system.

It is another object of the present invention to reduce the peak-to-average power ratio in a multitone diversity radio system.

Still other objects will become apparent in the following summary and description of a preferred embodiment of the invention.

SUMMARY OF THE INVENTION

The peak envelope voltage of a radio frequency transmitter employing modulation which places a signal and its diversity copy about a common carrier frequency is reduced while maintaining the same average power in the signal. This permits the gain and output power of the transmitter to be increased without overdriving the transmitter. This is accomplished by generating two multiple component information carrying audio signals, both based upon the same data, and adding a predetermined phase shift to each component of one of the two signals. Both combinations are fed into the transmitter such that each tone in one of the audio signals is transmitted simultaneously with its corresponding phase shifted tone in the second audio signal. In this way the RF components at different frequencies cannot directly sum to a high peak voltage, as they may without the phase shifts.

BRIEF DESCRIPTION OF THE DRAWINGS

The invention may be more fully understood by reading the following description of a preferred embodiment of the invention in conjunction with the appended drawings wherein.

DETAILED DESCRIPTION OF A PREFERRED EMBODIMENT

Figure 1:
FIG. 1 is a block diagram of a diversity data transmission system in which the present invention may be embodied.

Referring to FIG. 1, a diversity data transmission system in which the invention may be employed is shown. A data modulator 10 receives digital data from a digital data source (not shown), which may comprise any kind of device capable of generating digital information, ranging from digital control data to digitized voice information. Data modulator 10 modulates the digital data onto audio tones and feeds identical information to both the upper sideband input (USB IN) and the lower sideband input (LSB IN) of an RF translator, or exciter, 12. Although the term "audio" is used, it should be understood to include any baseband signal. RF translator 12 generates an independent sideband RF signal and couples it to a power amplifier (PA) 14. For the sake of simplicity, a 1.0 ohm impedance level is assumed for all voltages, both here and in all other figures.

The output of RF translator 12 is an RF signal in which the USB input tones have been translated to the frequencies of the RF carrier (e.g., 10 MHz.) plus their original frequencies, and the LSB input tones to the carrier frequency minus their original frequencies. For illustrative purposes the RF translator is assumed to have a gain of 1.0, and consequently each translated RF tone will have the same amplitude as the corresponding input audio tone. Power amplifier 14 increases the RF signal level so that it can be transmitted to a distant receiver via an antenna (not shown) coupled to its RF output line.

Figure 2:
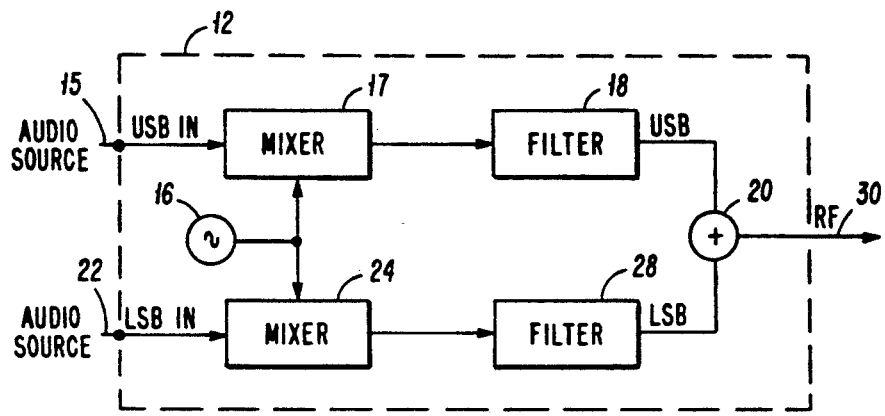
FIG. 2 is a block diagram of an independent sideband RF translator as may be used in connection with the present invention.

An independent sideband RF translator can simultaneously transmit signals of entirely different information content in its two sidebands. An independent sideband RF translator 12 is illustrated in FIG. 2. In this type of translator, a first mixer receives a first audio signal from line 15 on translator 12's "upper sideband" input (USB IN). The first audio signal is mixed in a first mixer 17 with a carrier signal produced by an oscillator 16. Mixer 17 is preferably of the balanced type which inherently suppresses the carrier and produces a double sideband, suppressed carrier RF signal which is fed to a first filter 18. Filter 18 removes the lower sideband, leaving the upper sideband, and feeds the result to a combiner 20.

Similarly a second mixer 24 receives a second audio signal from line 22 on translator 12's "lower sideband" input (LSB IN). The second audio signal is mixed in a second mixer 24 of the same type as first mixer 17, with the carrier signal produced by oscillator 16. Mixer 24 suppresses the carrier and produces a double sideband, suppressed carrier RF signal which is fed to a second filter 28. Filter 28 removes the upper sideband, leaving the lower sideband, and feeds the result to combiner 20. Combiner 20 combines the upper sideband signal from filter 18 with the lower sideband signal from filter 28 to produce a composite signal of the independent sideband variety. The resulting signal may feed to a power amplifier, such as 14 (FIG. 1), via line 30.

Although the present invention is not so limited, it can be advantageously used in a data transmission system as will be hereinafter illustrated. The data modulator should be of the type which modulates multiple tones to represent various input digital data values. For illustrative purposes, the tone modulators described herein will assume 4 streams of binary data represented as modulation on four tones centered at 500, 1000, 1500, and 2000 Hz. Each tone is assumed to have 1.0 volt peak amplitude and undergoes frequency-shift-key (FSK) on phase-shift-key (PSK) modulation.

Figure 3:
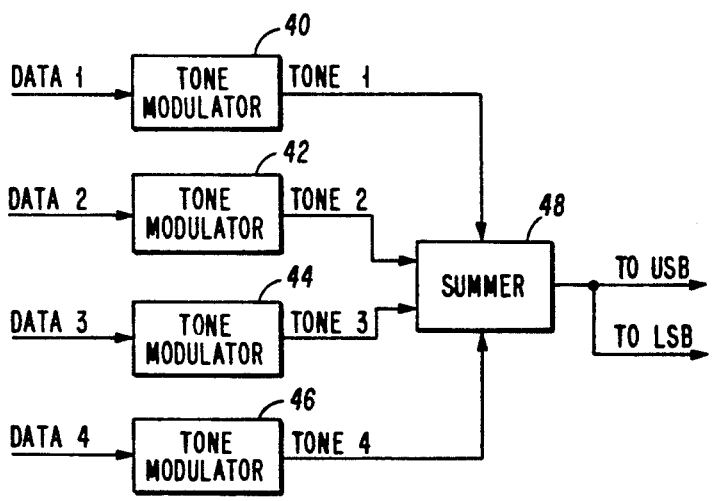
FIG. 3 is a block diagram of a conventional data modulator.

The invention may be better understood by comparison to a conventional four-tone data modulator as shown in FIG. 3. The data modulator comprises four tone modulators 40, 42, 44 and 46 each of which respectively receives data labelled DATA 1, DATA 2, DATA 3, and DATA 4 from a data source (not shown). Each of tone modulators 40–46 modulates (i.e. FSK or PSK) one of the aforementioned tones according to the data on its respective data line. The outputs of tone modulators 40–46 are coupled to a summer 48 which combines the four tones into a single tone stream. The output of summer 48 is coupled to the USB and LSB inputs of an RF translator in the manner described in connection with FIG. 1.

The following material will describe two methods of carrying of carrying out the invention, which for convenience are termed Method A and Method B. One embodiment of the apparatus for carrying out Method A will be shown, while two embodiments of apparatus for carrying out Method B will be shown.

Figure 4:
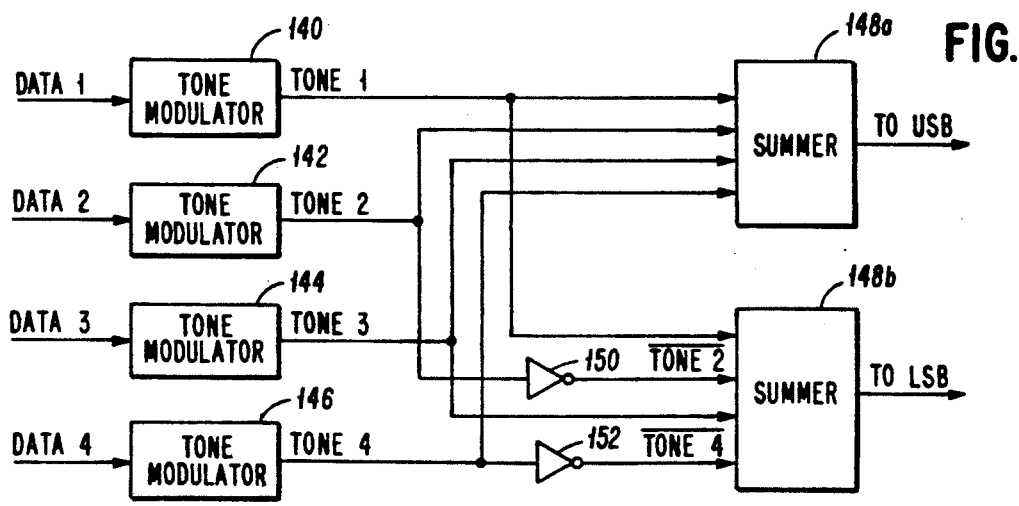
FIG. 4 is a block diagram of a data modulator for use in an embodiment of Method A of the invention.

In a first preferred embodiment of the invention (Method A), a special modem of the type shown in FIG. 4 may be used. In this embodiment the four tone modulators 140, 142, 144 and 146 (corresponding to tone modulators 40, 42, 44 and 46) are still used. However, instead of a single summer, two summers 148a and 148b and two inverters 150 and 152 are also used. The outputs from tone modulators 140 and 144 are coupled directly to summer 148b, but the outputs from tone modulators 142 and 146 are inverted by inverters 150 and 152, respectively before they are coupled to summer 148b. All the tones from tone modulators 140–146 are coupled directly to summer 148a. Instead of a single output being split into two portions as in FIG. 3, two separate outputs are generated within modulator 10. The output from summer 148a is coupled to the USB input of RF translator 12, and the output of summer 148b is coupled to the LSB input of RF translator 12. Alternatively the outputs of summers 148a and 148b could be coupled in reverse order to RF translator 12 without altering the invention.

The resulting output RF signal from translator 12 thus comprises a first sideband containing the tones and a second sideband containing one-half of the tones shifted by 180° and one-half unshifted.

Figure 5:
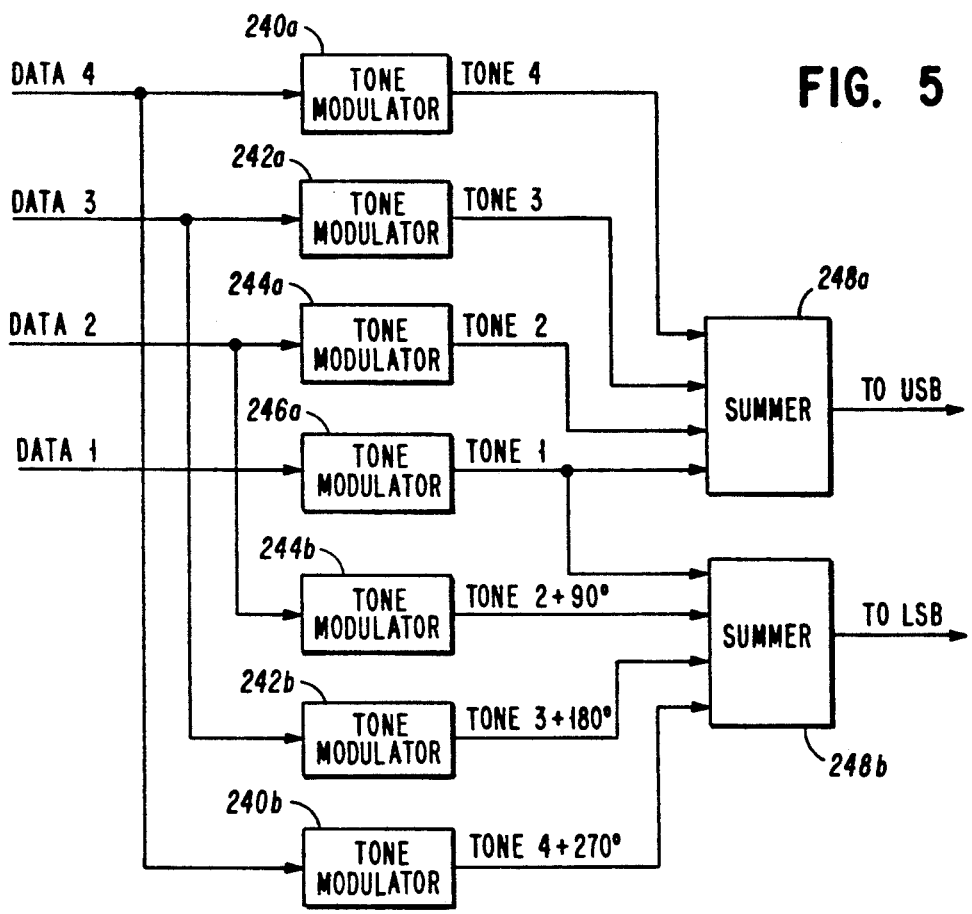
FIG. 5 is a block diagram of a data modulator for use in a first embodiment of Method B of the invention.

In a second embodiment of the invention another special modem of the type shown in FIG. 5 may be used. In addition to the four tone modulators 240a, 242a, 244a and 246a, and summer 248a, which correspond to similarly numbered elements (in the tens digits) in FIG. 3, the modified modulator contains additional tone modulators 240b, 242b and 244b in combination with a second summer 248b. Tone modulator 244b adds a 90 degree phase shift relative to the tone produced in tone generator 244a. In a like manner tone modulator 242b adds a 180° phase shift, and tone modulator 240b adds a 270° phase shift. It should be noted that TONE 1 is not shifted, but this can be viewed as a tone shift of 0° (or 360°). It should be understood that the particular phase shift is merely illustrative, although there should be a different phase shift for each tone, and the tone phase shifts should be evenly spaced over a 360° span. Tone modulators 240b, 242b and 244b in combination with summer 248b form a second composite audio signal in the data modulator. The output of summer 248a is thus coupled to the USB input of RF translator 12, and the output of summer 248B is coupled to the LSB input of Rf translator 12, or vice versa.

The resulting output RF signal from translator 12 thus comprises a first sideband containing the tones and a second sideband containing phase-shifted versions of the same tones.

Figure 6:
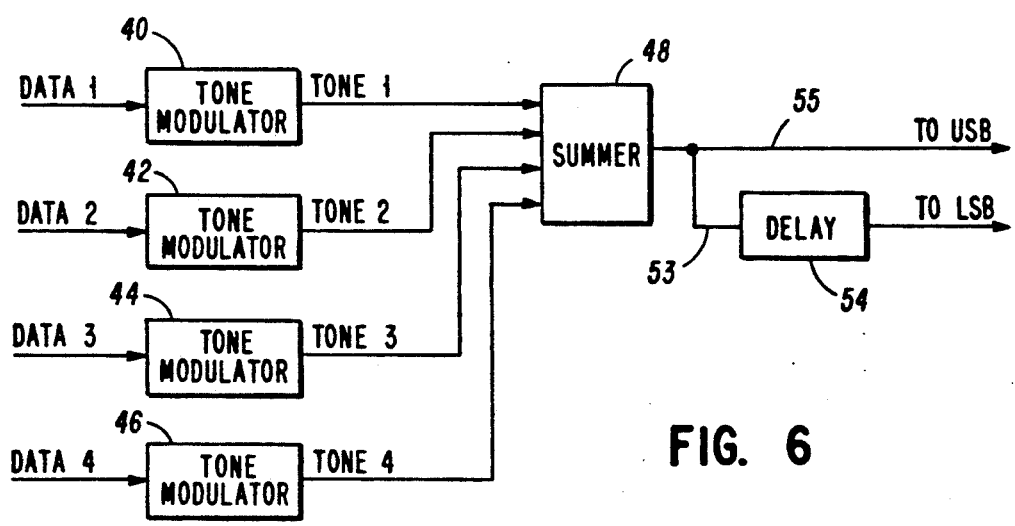
FIG. 6 is a block diagram of a conventional data modulator and associated devices for use in a second embodiment of Method B of the invention.

In an variation on the Method B (if the tones are evenly spaced in frequency), the same principles as used in the embodiment of FIG. 3 may be employed in the apparatus shown in FIG. 6. This variation uses the conventional modem illustrated in FIG. 3, with the addition of a delay device 54 in the modem output signal branch that is coupled to the LSB input of RF translator 12 (or the USB input if desired). Delay mechanism 54 effects the same phase shift span as is produced internally by tone modulators 240b, 242b and 244b of FIG. 5. For the example tones, a delay of 0.5 milliseconds (MS) would add phase shifts of 90, 120, 270, and 360° to tones 1, 2, 3 and 4 respectively.

For multitone data signals of the type just described, it can be shown that when the same audio signals are applied to both sidebands, as in FIG. 3 the peak RF voltage of the combined channels is the sum of the individual peak RF voltages for each tone. This increase in peak RF voltage limits the average power output of power amplifier 29. Applicant has discovered that in systems where identical multi-tone information, or its equivalent is transmitted on both sidebands of an independent sideband transmitter, shifting the phase of one of the tone input streams results in a signal which has the same informational content and average power but a lower peak voltage. This permits the gain of amplifier 14 to be increased significantly without exceeding its peak voltage limit.

Turning now to the theory of the invention, when the identical four audio tones are applied to both the USB and LSB inputs of translator 12, for the exemplary four-tone system the peak envelope voltage (PEV) will be 8 volts. Assuming power amplifier 14 has a peak envelope voltage (PEV) limit on its output of 8.0 volts, its gain is limited to 1.0. Then the average RF output power is 4.0 watts, 0.5 watt from each tone counting both sidebands.

Method A, as implemented in the data modulators shown in FIG. 4, forms a second composite audio signal at the data modulator with two of the four tones inverted (i.e., a 180° phase shift). By applying the signal to, say, the LSB input of translator 12 in place of the original, the PEV is reduced to 5.657 volts (8 volts /√2). Now the voltage gain of power amplifier 14 can rise by a multiplier of 1.414 (√2) and the average output power increases to 8 watts.

Method B, forms the second output of data modulator 10 by shifting the original tones so they are equally over a range of 360°. The four shifts could be 0°, 90°, 180° and 270°, for example, or they could just as easily be 45°, 135°, 225°, and 315°, or any other values, and in any order. For this method the PEV is 5.226 volts at the output of translator 12, and the power amplifier voltage gain can be increased by a factor of 1.531, resulting in an average output power of 9.373 watts.

The amplitude of the output of translator 12 can be shown to be the vector sum of a pair of counter-rotating phasors for each data modem tone. These phasor pairs have a "crossover" angle which is one-half the phase difference between the tone applied to the USB input of translator 12 and the same tone applied to the LSB input. The two unit phasors sum to a peak magnitude of 2.0 at the crossover angle and its reciprocal. Without modification the four-tone example has four phasor pairs with a 0° crossover angle and a resulting PEV of 8.0 volts (i.e., when all phasor pairs crossover at 0° or 180°). Inverting two of the four tones as in Method A results in a crossover angle of 90° for two phasor pairs. The resulting PEV is the vector sum of 4.0 at 90° and 4.0 at 0°, or 5.657 volts. Method B using phase differences of 0°, 90°, 180° and 270° for the tones results in crossover angles of 0°, 45°, 90° and 135°. The PEV of the vector sum of 2.0 volts at each crossover angle is 5.226 volts. It is helpful to notice that each phasor pair sums to a vector whose magnitude varies between 0 and 2.0 volts along either the crossover angle or its reciprocal. The envelope voltage is the magnitude of these four vectors summed together.

Method A works for two or more tones with a slight degradation for an odd total when exactly one-half of the tones cannot be inverted. It is not important which tones are inverted so long as the number is one-half (or as close thereto as can be integrally divided) of the total. Method B also works for two or more tones and equally well for both odd and even totals. Neither method requires that the tones be equally spaced in frequency. The delay alternative form of Method B as illustrated in FIG. 6, causes the modulation in the second channel to lag that in the normal channel. This degradation diminishes as the number of tones increases, decreasing the modulation rate for each tone.

Real power amplifiers actually let the output PEV exceed the limit value about 1 to 2 percent of the time. Actual power output improvement, therefore, is not as high as in the foregoing example. A probability distribution of the envelope voltage based on the number of tones and the method (either A or B) can give a more accurate output power improvement estimate (see Table 1). These distributions also show that with a conventional data modulator, the median envelope voltage is only 25 percent of the PEV for four tones. The median envelope voltage for either Method A or Method B is 45 percent of their PEV with four tones. There is less variation in the envelope voltage with either Method A or B, resulting in less gain changes for power amplifiers which adapt to the signal level. The delay method (using 0.62 ms delay) increased the average transmitter power 40-50 percent in laboratory tests with a 16 tone TADIL A (Mil-Std-188-203-1) data modulator. These tones deviate slightly from equal spacing, and one tone was twice the voltage of the others. Even with these deviations, the actual power improvement is in the range predicted in Table 1.

TABLE 1

| PERCENT RF POWER IMPROVEMENT | | | | | |
|---|---|---|---|---|---|
| | | PERCENT OF RF VOLTAGE EXCEEDING PA LIMIT | | | |
| TONES | METHOD | 0% | 1% | 2% | 5% |
| 4 | A | 100 | 83 | 72 | 54 |
| 4 | B | 134 | 95 | 78 | 48 |
| 8 | A | 100 | 59 | 49 | 33 |
| 8 | B | 144 | 56 | 48 | 34 |
| 12 | A | 100 | 51 | 43 | 31 |
| 12 | B | 145 | 49 | 43 | 31 |
| 16 | A | 100 | 50 | 41 | 31 |
| 16 | B | 146 | 50 | 42 | 31 |

While USB and LSB channels have been used as an example, any frequency translation method which symmetrically places each tone and its diversity copy about a common center frequency may be used. Under these conditions, fixed phase shifts can be introduced between the diversity and primary tone pairs, which reduces the peak voltage of the composite output signal. These fixed phase shifts do not hinder the normal and diversity channels from independently carrying the same information.

Each tone modulator in the example data modulators may be of the frequency-shift-keying, phase-shift-keying or differential phase-shift-keying type. For coherent PSK, phase shifts added to one channel must be accounted before combining the channels at the receiver. However, differential PSK and FSK require no correction. These methods will also benefit amplitude modulated tones and combinations of amplitude and phase or frequency modulated tones. Method B using a delay device is not limited to signals made up of modulated tones.

While particular embodiments of the present invention have been shown and described, it should be clear that changes and modifications may made to such embodiments without departing from the true scope and spirit of the invention. It is intended that the appended claims to cover all such changes and modifications.

I claim:

1. A diversity radio transmission apparatus capable of increased power output, comprising:
    means for providing first and second information carrying baseband signals comprising a multiplicity of components of different frequencies;
    means for shifting the phase of the first baseband signal by a predetermined amount coupled to said means for providing baseband signals;
    means for generating an RF signal coupled to said phase shifting means having said first and second baseband signals symmetrically disposed around a common frequency;
    wherein said RF signal may be transmitted to a receiver via an antenna means; and wherein said shifting evenly distributes the phase differences between the shifted and unshifted tone pairs over a 360 degree span.

2. A diversity radio transmission apparatus capable of increased power output, comprising:
- means for providing first and second information carrying baseband signals comprising a multiplicity of components of different frequencies;
- means for shifting the phase of the first baseband signal by a predetermined amount coupled to said means for providing baseband signals;
- means for generating an RF signal coupled to said phase shifting means having said first and second baseband signals symmetrically disposed around a common frequency;
- wherein said RF signal may be transmitted to a receiver via an antenna means;
- wherein said shifting means comprises means for delaying said first portion of said audio signal; and
- wherein said delaying means evenly distributes the phase shifts delayed versus undelayed tones over a span of 360 degrees.

3. A diversity radio transmission apparatus capable of increased power output, comprising:
- means for providing first and second information carrying baseband signals comprising a multiplicity of components of different frequencies;
- means for shifting the phase of the first baseband signal by a predetermined amount coupled to said means for providing baseband signals;
- means for generating an RF signal coupled to said phase shifting means having said first and second baseband signals symmetrically disposed around a common frequency;
- wherein said RF signal may be transmitted to a receiver via an antenna means; and
- wherein said shifting means comprises means for inverting a portion of the tones in said audio tone.

4. A multitone radio transmission apparatus as described in claim 3 wherein said inverting means inverts alternate tones in said audio tone.

5. A multitone diversity radio transmission apparatus capable of increased power output comprising:
- means for providing a digital information carrying signal;
- means for generating a multiple tone baseband signal each tone of which is representative of the instantaneous digital value of the information carrying signal coupled to said means for providing a digital signal;
- means for generating first and second baseband signals related to the multiple tone baseband signal coupled to said means for generating multiple tone baseband signal;
- means for shifting the phase of the first generated baseband signal by a predetermined amount coupled to said generating baseband signal means; and
- means for generating an RF signal coupled to said phase shifting means having said first and second generated audio signals disposed around a common center frequency;
- wherein said shifting means comprises means for delaying said first generated audio signal; and
- wherein said delaying means evenly distributes the phase shifts delayed versus undelayed tones over a span of 360 degrees.

* * * * *